No. 793,745. PATENTED JULY 4, 1905.
J. SHIELDS.
MEANS FOR REMOVING DUST FROM GASES.
APPLICATION FILED AUG. 22, 1904.

Witnesses
Inventor
John Shields
By his Attorneys
Baldwin & Wright

No. 793,745.

Patented July 4, 1905.

UNITED STATES PATENT OFFICE.

JOHN SHIELDS, OF WILLESDEN GREEN, ENGLAND.

MEANS FOR REMOVING DUST FROM GASES.

SPECIFICATION forming part of Letters Patent No. 793,745, dated July 4, 1905.

Application filed August 22, 1904. Serial No. 221,787.

*To all whom it may concern:*

Be it known that I, JOHN SHIELDS, doctor of science, a subject of the King of Great Britain, residing at 4 Stanley Gardens, Willesden Green, in the county of Middlesex, England, have invented certain new and useful Improved Means for Removing Dust from Gases, of which the following is a specification.

According to this invention I conduct the dusty gases beneath or into the midst of a constantly-replenished heap of any suitable porous or granular material and allow the gases to pass upward through the heap, and so escape. The filtering material collects the dust and is gradually drawn away from the bottom of the heap, the top of which is constantly replenished with fresh material. The gases thus encounter cleaner and cleaner material as they rise. Such a filter is especially useful in the treatment of the gases issuing from pyrites-burners, but may be used to cleanse any other gases, as desired.

Figure 1:
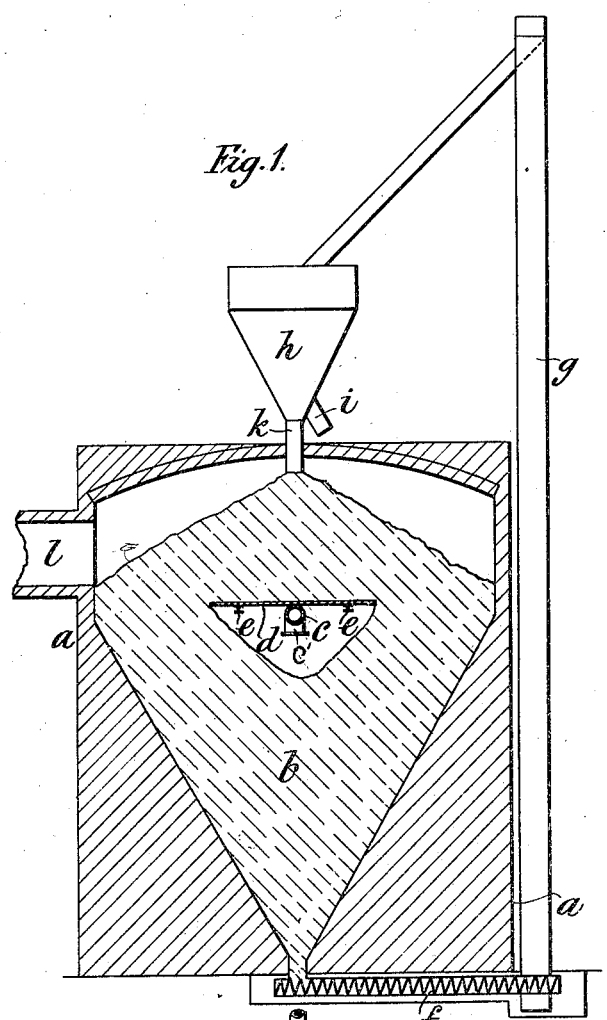
Figure 2:
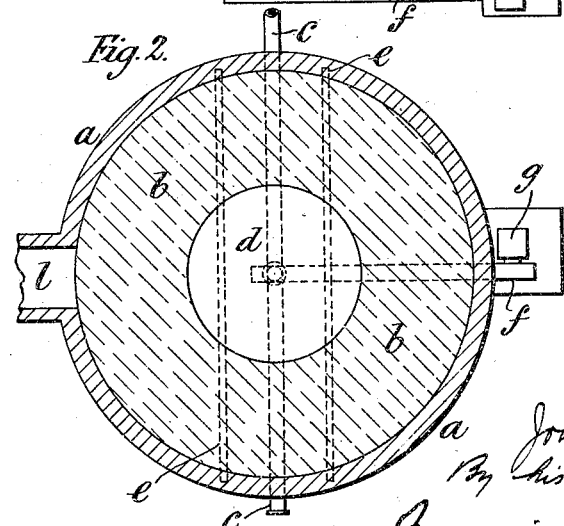

The filtering material may be coke, sand, crushed quartz, granulated or crushed slag, pumice or volcanic stone, or the like, and the material which is removed from the bottom of the heap may be cleaned and raised and delivered while still hot onto the top of the heap. I employ a heap approximately of the shape of two cones placed base to base, such as I have illustrated in the drawings, Figure 1 being a vertical, and Fig. 2 a horizontal, section.

*a* is a chamber the lower portion of which is of approximately conical shape.

*b* is the filtering material.

The gases are conducted into the heap by a pipe *c*, having a downwardly-projecting outlet-orifice *c'*, situated beneath a horizontal disk *d*, supported by the pipe *c* and girders *e*, which disk creates a cavity in the middle of the heap. The material is continuously drawn away from the bottom of the chamber by a screw conveyer *f* and may be raised by an elevator *g* to a pneumatic or other separator *h*, where the dust is removed and passes away by the chute *i*, while the cleaned material falls through a chute *k* onto the top of the heap. The gases pass up through the upper portion of the heap, meeting cleaner material as they rise, and finally escape by the outlet *l*. The large exposed upper surface of the top of the heap, through which the filtered gas can pass away into the space at the top of the chamber, insures that the velocity of the escaping gases shall be but small, so that very efficient filtration is insured, and dry in place of moistened material may be used for the filtering. If desired, the height of the chamber above the disk may be increased and the material delivered onto the top of the heap in such a way that the thickness of material through which the gases have to pass may be varied at pleasure.

What I claim is—

1. In a filter for removing dust from gases, the combination of a closed chamber, the lower portion of which tapers downward to an outlet-orifice, an opening at the top through which granular material is always free to drop down into the chamber, a mound of granular material resting in and supported by the tapering lower portion of the chamber and having a conical upper surface, the sloping sides of which extend to the opening at the top so that a space is left between this upper sloping surface and the top of the chamber, an outlet from this space for filtered gases to pass away, means for introducing gases to be filtered into the body of the mound of granular material, means for drawing off granular material from the orifice at the bottom, means for cleansing the dusty material withdrawn from the heap and means for delivering the cleansed material to the top of the heap.

2. In a filter for removing dust from gases, the combination of a closed chamber, the lower portion of which tapers downward to an outlet-orifice, an opening at the top through which granular material is always free to drop down into the chamber, a mound of granular material raised in and supported by the tapering lower portion of the chamber and having a conical upper surface, the sloping sides of which extend to the opening at the top so that a space is left between this upper sloping surface and the top of the chamber, an outlet from this space for filtered gases to pass away, means for introducing gases to be filtered into the body of the mound of granular material and means for drawing off granular material from the orifice at the bottom.

JOHN SHIELDS.

Witnesses:
ALFRED NUTTING,
R. T. WILLIAMS.